United States Patent
Cerny et al.

(10) Patent No.: US 10,260,419 B2
(45) Date of Patent: Apr. 16, 2019

(54) COOLING SYSTEM (71) Applicant: General Electric Company, Schenectady, NY (US)

(72) Inventors: Matthew Robert Cerny, West Chester, OH (US); Christopher James Kroger, Cincinnati, OH (US); Brandon Wayne Miller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 909 days.

(21) Appl. No.: 14/814,546

(22) Filed: Jul. 31, 2015

(65) Prior Publication Data

US 2017/0030266 A1    Feb. 2, 2017

(51) Int. Cl.
| | |
|---|---|
| *F02C 7/06* | (2006.01) |
| *F02C 7/14* | (2006.01) |
| *F02C 7/18* | (2006.01) |
| *F02C 7/224* | (2006.01) |
| *F02C 7/16* | (2006.01) |

(Continued)

(52) U.S. Cl.
CPC ............... *F02C 7/06* (2013.01); *F02C 7/14* (2013.01); *F02C 7/16* (2013.01); *F02C 7/185* (2013.01); *F02C 7/224* (2013.01); *F25B 1/00* (2013.01); *F25B 41/062* (2013.01); *F28D 15/00* (2013.01); *F28F 27/02* (2013.01); *F05D 2260/213* (2013.01); *F28D 2021/0021* (2013.01); *F28D 2021/0026* (2013.01); *F28F 2250/08* (2013.01); *Y02T 50/676* (2013.01)

(58) Field of Classification Search
CPC ...... F02C 7/06; F02C 7/14; F02C 7/16; F02C 7/185; F02C 7/224
See application file for complete search history.

(56) References Cited

U.S. PATENT DOCUMENTS

| | | | |
|---|---|---|---|
| 4,505,124 A | 3/1985 | Mayer | |
| 4,550,573 A | 11/1985 | Rannenberg | |

(Continued)

FOREIGN PATENT DOCUMENTS

JP    S59-32893 U    2/1984

OTHER PUBLICATIONS

Notification of Reasons for Refusal issued in connection with corresponding JP Application No. 2016-103804 dated Jul. 4, 2017.

(Continued)

*Primary Examiner* — Craig Kim
(74) *Attorney, Agent, or Firm* — General Electric Company; Pamela Kachur (57) ABSTRACT

A thermal management system for a gas turbine engine and/or an aircraft is provided including a thermal transport bus having a heat exchange fluid flowing therethrough. The thermal management system also includes a plurality of heat source exchangers and at least one heat sink exchanger. The plurality of heat source exchangers and the at least one heat sink exchanger are in thermal communication with the heat exchange fluid in the thermal transport bus. The plurality of heat source exchangers are arranged along the thermal transport bus and configured to transfer heat from one or more accessory systems to the heat exchange fluid, and the at least one heat sink exchanger is located downstream of the plurality of heat source exchangers and configured to remove heat from the heat exchange fluid.

20 Claims, 3 Drawing Sheets

(51) Int. Cl.
*F25B 1/00* (2006.01)
*F25B 41/06* (2006.01)
*F28D 15/00* (2006.01)
*F28F 27/02* (2006.01)
*F28D 21/00* (2006.01)

(56) References Cited

U.S. PATENT DOCUMENTS

| | | | |
|---|---|---|---|
| 5,414,992 A * | 5/1995 | Glickstein | B64D 13/006 60/39.83 |
| 5,724,806 A * | 3/1998 | Horner | F02C 7/12 60/728 |
| 6,182,435 B1 * | 2/2001 | Niggemann | B64D 41/00 60/266 |
| 6,250,097 B1 | 6/2001 | Lin et al. | |
| 6,415,595 B1 * | 7/2002 | Wilmot, Jr. | B64D 13/006 60/266 |
| 7,260,926 B2 | 6/2007 | Sabatino et al. | |
| 7,882,704 B2 | 2/2011 | Chen | |
| 8,499,822 B2 * | 8/2013 | Bulin | F02C 7/14 165/41 |
| 8,522,572 B2 | 9/2013 | Coffinberry et al. | |
| 8,944,367 B2 | 2/2015 | Bystry, Jr. et al. | |
| 8,984,884 B2 | 3/2015 | Xu et al. | |
| 2009/0188234 A1 | 7/2009 | Suciu et al. | |
| 2010/0212857 A1 | 8/2010 | Bulin et al. | |
| 2011/0000227 A1 * | 1/2011 | Kamiya | F04C 23/006 62/6 |
| 2014/0000275 A1 * | 1/2014 | Kesseli | F02C 7/22 60/776 |
| 2014/0360153 A1 | 12/2014 | Papa et al. | |

OTHER PUBLICATIONS

European Search Report and Opinion issued in connection with corresponding EP Application No. 16171821.8 dated Dec. 16, 2016.
Machine translation and Office Action issued in connection with corresponding JP Application No. 2016103804 dated Jul. 4, 2017.

* cited by examiner

COOLING SYSTEM

STATEMENT REGARDING FEDERALLY SPONSORED RESEARCH & DEVELOPMENT

The US Government may have certain rights in this invention pursuant to VCAT Phase 1 Technology Development Contract N00014-10-D-0010.

FIELD OF THE INVENTION

The present subject matter relates generally to an integrated cooling system for a gas turbine engine and/or an aircraft.

BACKGROUND OF THE INVENTION

A gas turbine engine generally includes a fan and a core arranged in flow communication with one another. Various accessory systems are included to ensure that the fan and/or core operate as desired. For example, a main lubrication system provides lubrication to, e.g., bearings and gear meshes within a compressor section, a turbine section, and a power gear box (if provided). In addition to the lubricating properties provided to such components, the main lubrication system removes heat from such components such that they may operate within a desired temperature range.

Other accessory systems of the gas turbine engine, such as an environmental control system, also require heat removal during operation. Accordingly, gas turbine engines typically include numerous heat exchangers, each heat exchanger dedicated to an individual accessory system of the gas turbine engine. At least certain of these individual accessory systems of the gas turbine engine require a maximum heat removal at potentially different stages of the gas turbine engine run cycle. However, as the heat exchangers are dedicated to an individual system, each heat exchanger must be sized to accommodate the maximum heat removal required for the respective accessory system. Such a configuration may result in an inefficient use of the heat exchangers. For example, such a configuration may result in certain heat exchangers operating at maximum capacity, while other heat exchangers are operated at a nominal capacity (or not at all).

Accordingly, a cooling system for a gas turbine engine capable of efficiently allocating heat exchanger resources would be beneficial. More particularly, the cooling system for a gas turbine engine capable of efficiently allocating heat exchanger resources such that less heat exchangers or smaller heat exchangers may be included in the gas turbine engine (which may also impact the size, weight, and design of associated hardware) would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a thermal management system for incorporation at least partially into at least one of a gas turbine engine or an aircraft is provided. The thermal management system includes a thermal transport bus having a heat exchange fluid flowing therethrough and a pump for generating a flow of the heat exchange fluid in the thermal transport bus. The thermal management system also includes a plurality of heat source exchangers in thermal communication with the heat exchange fluid in the thermal transport bus. The plurality of heat source exchangers are arranged along the thermal transport bus. The thermal management system also includes at least one heat sink exchanger permanently or selectively in thermal communication with the heat exchange fluid in the thermal transport bus at a location downstream of the plurality of heat source exchangers.

In another exemplary embodiment of the present disclosure, a gas turbine engine is provided. The gas turbine engine includes a compressor section coupled to a turbine section by one or more shafts and a main lubrication system for providing lubrication to one or more components located in at least one of the compressor section or the turbine section. The gas turbine engine also includes a thermal management system having a thermal transport bus having a heat exchange fluid flowing therethrough and a plurality of heat source exchangers in thermal communication with the heat exchange fluid in the thermal transport bus. The plurality of heat source exchangers are arranged along the thermal transport bus and include a heat exchanger for transferring heat from the main lubrication system to the heat exchange fluid in the thermal transport bus. The thermal management system also includes at least one heat sink exchanger permanently or selectively in thermal communication with the heat exchange fluid in the thermal transport bus at a location downstream of the plurality of heat source exchangers.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
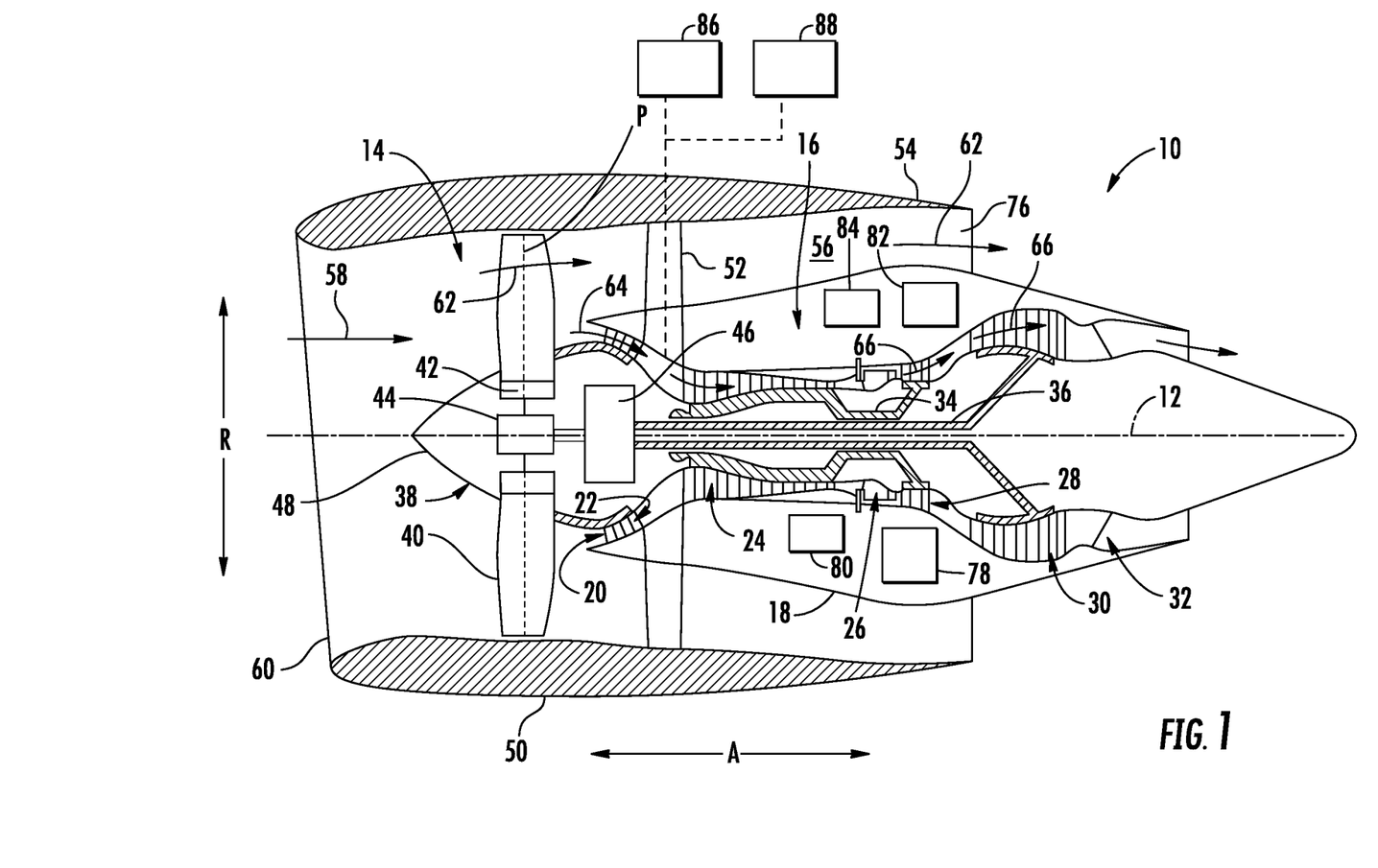
FIG. 1 is a schematic, cross-sectional view of an exemplary gas turbine engine according to various embodiments of the present subject matter.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Moreover, as is depicted schematically, the exemplary turbofan engine 10 further includes various accessory systems to aid in the operation of the turbofan engine 10 and/or an aircraft including the turbofan engine 10. For example, the exemplary turbofan engine 10 further includes a main lubrication system 78 configured to provide a lubricant to, e.g., various bearings and gear meshes in the compressor section (including the LP compressor 22 and HP compressor 24), the turbine section (including the HP turbine 28 and the LP turbine 30), the HP spool 34, the LP spool 36, and the power gear box 46. The lubricant provided by the main lubrication system 78 may increase the useful life of such components and may remove a certain amount of heat from such components. Additionally, the turbofan engine 10 includes a compressor cooling air (CCA) system 80 for providing air from one or both of the HP compressor 24 or LP compressor 22 to one or both of the HP turbine 28 or LP turbine 30. Moreover, the exemplary turbofan engine 10 includes an active thermal clearance control (ACC) system 82 for cooling a casing of the turbine section to maintain a clearance between the various turbine rotor blades and the turbine casing within a desired range throughout various engine operating conditions. Furthermore, the exemplary turbofan engine 10 includes a generator lubrication system 84 for providing lubrication to an electronic generator, as well as cooling/heat removal for the electronic generator. The electronic generator may provide electrical power to, e.g., a startup electric motor for the turbofan engine 10 and/or various other electronic components of the turbofan engine 10 and/or an aircraft including the turbofan engine 10.

As is also depicted schematically, the exemplary turbofan engine 10 drives or enables various other accessory systems for an aircraft including the exemplary turbofan engine 10. For example, the exemplary turbofan engine 10 provides compressed air from the compressor section to an environmental control system (ECS) 86. The ECS 86 may provide an air supply to a cabin of the aircraft for pressurization and thermal control. Additionally, air may be provided from the exemplary turbofan engine 10 to an electronics cooling system 88 for maintaining a temperature of certain electronic components of the turbofan engine 10 and/or aircraft within a desired range.

Prior turbofan engines 10 included individual heat exchangers for each of these accessory systems to remove heat from air and/or lubrication in such systems. However, aspects of the present disclosure include a thermal management system 100 (see FIG. 2) for transferring heat from some or all of such accessory systems to more efficiently remove such heat.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2:
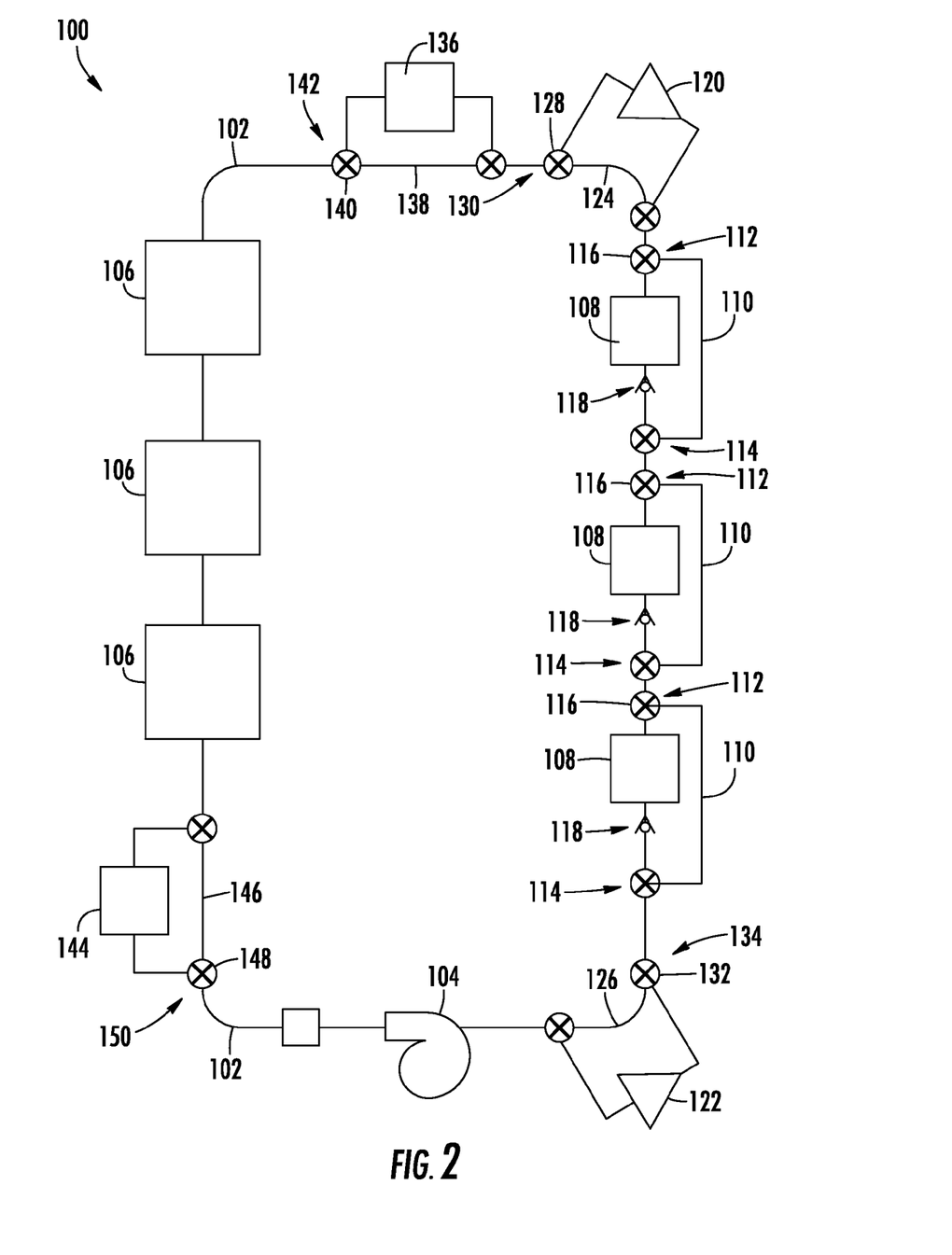
FIG. 2 is a simplified schematic view of a thermal management system in accordance with an exemplary embodiment of the present disclosure.

Referring now to FIG. 2, a schematic, flow diagram is provided of a thermal management system 100 in accordance with an exemplary embodiment of the present disclosure for incorporation at least partially into the exemplary turbofan engine 10 of FIG. 1.

As shown, the thermal management system 100 generally includes a thermal transport bus 102. The thermal transport bus 102 includes an intermediary heat exchange fluid flowing therethrough and may be formed of one or more suitable fluid conduits. The heat exchange fluid may be an incompressible fluid having a high temperature operating range. For example, in certain embodiments, heat exchange fluid may be a water and ethanol mixture, or any suitable dielectric fluid. A pump 104 is provided in fluid communication with the heat exchange fluid in the thermal transport bus 102 for generating a flow of the heat exchange fluid in the thermal transport bus 102. As viewed in FIG. 2, the pump 104 may generate a flow of the heat exchange fluid generally in a clockwise direction through the thermal transport bus 102. The pump 104 may be a rotary pump including an impeller, or alternatively may be any other suitable fluid pump. Additionally, the pump 104 may be powered by an electric motor, or alternatively may be in mechanical communication with and powered by, e.g., the HP shaft 34 or the LP shaft 36 of the turbofan engine 10.

Moreover, the exemplary thermal management system 100 includes a plurality of heat source exchangers 106 in thermal communication with the heat exchange fluid in the thermal transport bus 102. The plurality of heat source exchangers 106 are configured to transfer heat from one or more of the accessory systems of the turbofan engine 10 (or in operable communication with the turbofan engine 10) to the heat exchange fluid in the thermal transport bus 102. For example, in certain exemplary embodiments, the plurality of heat source exchangers 106 may include two or more of: a main lubrication system heat exchanger for transferring heat from the main lubrication system 78; a CCA system heat source exchanger for transferring heat from the CCA system 80; an ACC system heat source exchanger for transferring heat from the ACC system 82; a generator lubrication system heat source exchanger for transferring heat from the generator lubrication system 84; an ECS heat exchanger for transferring heat from the ECS 86; and an electronics cooling system heat exchanger for transferring heat from the electronics cooling system 88. Accordingly, a thermal management system 100 in accordance with an exemplary embodiment of FIG. 2 may transfer heat from a variety of independent systems to the heat exchange fluid in the thermal transport bus 102 for removal.

For the embodiment depicted, there are three heat source exchangers 106, the three heat source exchangers 106 each arranged in series flow along the thermal transport bus 102. However, in other exemplary embodiments, any other suitable number of heat source exchangers 106 may be included and one or more of the heat source exchangers 106 may be arranged in parallel flow along the thermal transport bus 102. For example, in other embodiments, there may only be at least two heat source exchangers 106 in thermal communication with the heat exchange fluid in the thermal transport bus 102, or alternatively, there may be at least four heat source exchangers 106, at least five heat source exchangers 106, or at least six heat source exchangers 106 in thermal communication with heat exchange fluid in the thermal transport bus 102.

Additionally, the exemplary thermal management system 100 of FIG. 2 further includes at least one heat sink exchanger 108 permanently or selectively in thermal communication with the heat exchange fluid in the thermal transport bus 102. The at least one heat sink exchanger 108 is located downstream of the plurality of heat source exchangers 106 and is configured for transferring heat from the heat exchange fluid in the thermal transport bus 102, e.g., to atmosphere, to fuel, to a fan stream, etc. For example, in certain embodiments the at least one heat sink exchanger 108 may include at least one of a RAM heat exchanger, a fuel heat exchanger, a fan stream heat exchanger, or a bleed air heat exchanger. The RAM heat exchanger may be configured as an "air to heat exchange fluid" heat exchanger integrated into one or both of the turbofan engine 10 or an aircraft including the turbofan engine 10. During operation, the RAM heat exchanger may remove heat from any heat exchange fluid therein by flowing a certain amount of RAM air over the RAM heat exchanger. Additionally, the fuel heat exchanger is a "fluid to heat exchange fluid" heat exchanger wherein heat from the heat exchange fluid is transferred to a stream of liquid fuel for the turbofan engine 10. Moreover, the fan stream heat exchanger is generally an "air to heat exchange fluid" heat exchanger which flows, e.g., bypass air over heat exchange fluid to remove heat from the heat exchange fluid. Further, the bleed air heat exchanger is generally an "air to heat exchange fluid" heat exchanger which flows, e.g., bleed air from the LP compressor over heat exchange fluid to remove heat from the heat exchange fluid.

For the embodiment of FIG. 2, the at least one heat sink exchanger 108 of the thermal management system 100 depicted includes a plurality of individual heat sink exchangers 108. More particularly, for the embodiment of FIG. 2, the at least one heat sink exchanger 108 includes three heat sink exchangers 108 arranged in series. The three heat sink exchangers 108 are configured as a RAM heat exchanger, a fuel heat exchanger, and a fan stream heat exchanger. However, in other exemplary embodiments, the at least one heat sink exchanger 108 may include any other suitable number of heat sink exchangers 108. For example, in other exemplary embodiments, a single heat sink exchanger 108 may be provided, at least two heat sink exchangers 108 may be provided, at least four heat sink exchangers 108 may be provided, or at least five heat sink exchangers 108 may be provided. Additionally, in still other exemplary embodiments, two or more of the at least one heat sink exchangers 108 may alternatively be arranged in parallel flow with one another.

The plurality of heat sink exchangers 108 depicted are selectively in thermal communication with the heat exchange fluid in the thermal transport bus 102. More particularly, the thermal management system 100 depicted includes a plurality of bypass lines 110 for selectively bypassing each heat sink exchanger 108 in the plurality of heat sink exchangers 108. Each bypass line 110 extends between an upstream juncture 112 and a downstream juncture 114—the upstream juncture 112 located just upstream of a respective heat sink exchanger 108, and the downstream juncture 114 located just downstream of the respective heat sink exchanger 108. Additionally, each bypass line 110 meets at the respective upstream juncture 112 with the thermal transport bus 102 via a three-way heat sink valve 116. The three-way heat sink valves 116 each include an inlet fluidly connected with the thermal transport bus 102, a first outlet fluidly connected with the thermal transport bus 102, and a second outlet fluidly connected with the bypass line 110. The three-way heat sink valves 116 may each be a variable throughput three-way valve, such that the three-way heat sink valves 116 may vary a throughput from the inlet to the first and/or second outlets. For example, the three-way heat sink valves 116 may be configured for providing anywhere between zero percent (0%) and one hundred percent (100%) of the heat exchange fluid from the inlet to the first outlet, and similarly, the three-way heat sink valves 116 may be configured for providing anywhere between zero percent (0%) and one hundred percent (100%) of the heat exchange fluid from the inlet to the second outlet.

Notably, the three-way heat sink valves 116 may be in operable communication with a controller of the turbofan engine 10 and/or of an aircraft including the turbofan engine 10. The controller may bypass one or more of the at least one heat sink exchangers 108 based on, e.g., an operating condition of the turbofan engine 10 and/or aircraft, a temperature of the heat exchange fluid, and/or any other suitable variables. Alternatively, the controller may bypass one or more of the at least one heat sink exchangers 108 based on a user input.

Further, each bypass line 110 also meets at the respective downstream juncture 114 with the thermal transport bus 102. Between each heat sink exchanger 108 and downstream juncture 114, the thermal transport bus 102 includes a check valve 118 for ensuring a proper flow direction of the heat exchange fluid. More particularly, the check valve 118 prevents a flow of heat exchange fluid from the downstream juncture 114 towards the respective heat sink exchanger 108.

The thermal management system 100 of FIG. 2 may more efficiently remove heat from the various accessory systems of the turbofan engine 10 and/or the aircraft. For example, the various accessory systems may generate a varying amount of heat dependent on various operating conditions of the turbofan engine 10 and/or the aircraft. However, not all of the accessory systems define the same heat pattern (i.e., not all of the accessory systems heat up and cool down at the same time). For example, the main lubrication system 78 may require a maximum amount of heat removal during high load conditions of the turbofan engine 10. By contrast, however, the ECS 86 may require a max amount of heat removal during high-altitude flight. Accordingly, by integrating the heat removal for the variety of different accessory systems, less heat exchangers may be required to remove a desired amount of heat and/or smaller heat exchangers may be required to remove a desired amount of heat.

Moreover, due to the configuration of the various heat sink exchangers 108 being in selective thermal communication with the heat exchange fluid in the thermal transport bus 102, heat may be removed from the various accessory systems in a more efficient manner. For example, when a relatively low amount of heat is required to be removed from the heat exchange fluid, the most efficient heat sink exchanger 108 may be utilized and the others bypassed. However, when a relatively high amount of heat is required to be removed from the heat exchange fluid, the additional heat sink exchangers 108 may also be utilized. Notably, such a configuration may allow for utilization of the fuel heat exchanger without risk of heating the fuel to a point where de-oxygenation systems are required to be included. For example, prior fuel heat exchangers run the risk of fuel coking or deposit formation within the fuel system when a temperature of the fuel is increased past a predetermined threshold (thus requiring the de-oxygenation systems). Due to the redundant and selective configuration of the various heat sink exchangers 108 for the embodiment depicted, however, utilization of the fuel heat exchanger may be ceased prior to the fuel reaching such a predetermined threshold.

Furthermore, in the exemplary embodiments including a plurality of heat sink exchangers 108 having bypass capability, for example, the additional heat sink exchangers have the benefit of adding redundancy to the thermal management system 100. For example, in the event of a failure of one or more of the heat sink exchangers 108 or associated portions of the thermal transport bus 102, the heat exchange fluid may be routed around such failure and the system 100 may continue to provide at least some heat removal.

Further still, it should be appreciated that in at least certain exemplary embodiments, the thermal management system 100 may additionally be configured to heat oil, for example, when operating in cold conditions or when starting the aircraft and/or engine. For example, in certain exemplary embodiments, the thermal management system 100 may bypass each of the heat sink exchangers 108 such that heat from one of the heat source exchangers 106 may be used to heat oil from a different one of the heat sources. For example, heat from one of the heat source exchangers 106 may be used to heat lubrication oil from the main lubrication system 78 to allow for a proper lubrication oil viscosity in a power gearbox 46.

Referring still to FIG. 2, the exemplary thermal management system 100 depicted further utilizes a refrigeration cycle to more efficiently remove heat from the various heat source exchangers 106. Specifically, the thermal management system 100 includes a compressor 120 for compressing the heat exchange fluid in the thermal transport bus 102, and an expansion device 122 for expanding the heat exchange fluid in the thermal transport bus 102. Notably, with such a configuration (and others), the heat exchange fluid may not be an incompressible fluid. The compressor 120 is selectively in fluid communication with the heat exchange fluid at a location downstream of the heat source exchangers 106 and upstream of the at least one heat sink exchanger 108. By contrast, the expansion device 122 is selectively in fluid communication with the heat exchange fluid at a location downstream of the at least one heat sink exchanger 108 and upstream of the heat source exchangers 106. In such an exemplary embodiment, the compressor 120 may be driven by, e.g., an electric motor, or alternatively may be in mechanical communication with and driven by a rotary component of the turbofan engine 10, such as the HP shaft 34 or the LP shaft 36. Notably, with such a configuration, the one or more heat sink exchangers 108 acts as a condenser, and the plurality of heat source exchangers 106 acts as an evaporator. Such a configuration may allow for more efficient heat removal from the various heat source exchangers 106, and heat transfer to the one or more heat sink exchangers 108. It should also be appreciated, that in certain exemplary embodiments, the expansion device 122 may be utilized as a power generating device configured to generate rotational power from a flow of heat exchange fluid therethrough.

As is depicted, the thermal transport bus 102 additionally includes a compressor bypass line 124 for selectively bypassing the compressor 120 and an expansion device bypass line 126 for selectively bypassing the expansion device 122. Moreover, a three-way compressor bypass valve 128 is positioned at an upstream juncture 130 for selectively bypassing the compressor 120, and similarly, a three-way expansion device bypass valve 132 is positioned at an upstream juncture 134 for selectively bypassing the expansion device 122. The three-way compressor bypass valve 128 and three-way expansion device bypass valve 132 may each be configured in substantially the same manner as the exemplary three-way heat sink valves 116 described above for bypassing operation of a respective heat sink exchanger 108.

Further, the exemplary thermal management system 100 of FIG. 2 includes features for de-icing certain components of an aircraft. Specifically, the exemplary thermal management system 100 includes a de-icing module 136 in thermal communication with the heat exchange fluid in the thermal transport bus 102 at a location downstream of the plurality of heat source exchangers 106 and upstream of the at least one heat sink exchanger 108. The de-icing module 136 may be configured to utilize heat from the heat exchange fluid in the thermal transport bus 102 to warm components of the aircraft susceptible to icing. Depending on, e.g., the aircraft and atmospheric conditions, ice may be prone to forming on the fuselage of the aircraft, the wings of the aircraft, etc. Accordingly, in certain embodiments, the de-icing module 136 may include one or more fluid lines (not shown) mounted in thermal communication with a surface of e.g., the fuselage of the aircraft, the wings of the aircraft, etc. When utilized, the fluid lines of the de-icing module 136 may provide a flow of the heat exchange fluid in the thermal transport bus 102 therethrough, or alternatively, may have a separate de-icing fluid that transfers heat from the heat exchange fluid using, e.g., a de-icing heat exchanger (not shown).

As with the various thermal management system 100 components discussed above, the thermal management system 100 additionally includes a bypass line 138 for selectively bypassing the de-icing module 136. A three-way de-icing module valve 140 is positioned at an upstream juncture 142 for selectively activating the de-icing module 136. The three-way de-icing module valve 140 may be configured in substantially the same manner as the exemplary three-way heat sink valves 116 described above for bypassing operation of a respective heat sink exchanger 108.

Furthermore, the exemplary thermal management system 100 of FIG. 2 additionally includes a fuel chiller 144 selectively in thermal communication with heat exchange fluid in the thermal transport bus 102 at a location upstream of the plurality of heat source exchangers 106 and downstream of the at least one heat sink exchangers 108. The fuel chiller 144 may be configured to remove heat from the fuel of the turbofan engine 10 to assist with maintaining the fuel within a desired temperature range. As with various other components of the thermal management system 100 of FIG. 2, the thermal management system 100 additionally includes a fuel chiller bypass line 146 for selectively bypassing the fuel chiller 144 and a three-way fuel chiller bypass valve 148. The three-way fuel chiller bypass valve 148 is located at an upstream juncture 150 and fluidly connects the thermal transport bus 102 and fuel chiller bypass line 146. The fuel chiller bypass valve 148 may be a variable throughput three-way valve configured in substantially the same manner as the exemplary three-way heat sink valves 116 described above for bypassing operation of a respective heat sink exchanger 108.

It should be appreciated, however, that the thermal management system 100 is provided by way of example only, and that in other exemplary embodiments, the thermal management system 100 may be configured in any other suitable manner. For example, in other exemplary embodiments, the thermal management system 100 may not be configured as a refrigerant cycle, i.e., the thermal management system 100 may not include one or both of the compressor 120 or the expansion device 122. Additionally, in other exemplary embodiments, the thermal management system 100 may not include certain other components depicted in FIG. 2, such as the de-icing module 136 and/or the fuel chiller 144, or alternatively may include other components not described herein.

A thermal management system in accordance with an exemplary embodiment present disclosure may allow for a gas turbine engine and aircraft including such a gas turbine engine to operate more efficiently. More particularly, inclusion of a thermal management system in accordance with an exemplary embodiment of the present disclosure may allow for a reduction in volume of a core of the gas turbine engine as less heat exchangers and/or smaller heat exchangers may be required to maintain a desired amount of heat removal. Additionally, the heat removed using a thermal management system in accordance with an exemplary embodiment of the present disclosure may allow for redirection of such heat to one or more accessory systems that require heat to operate.

Figure 3:
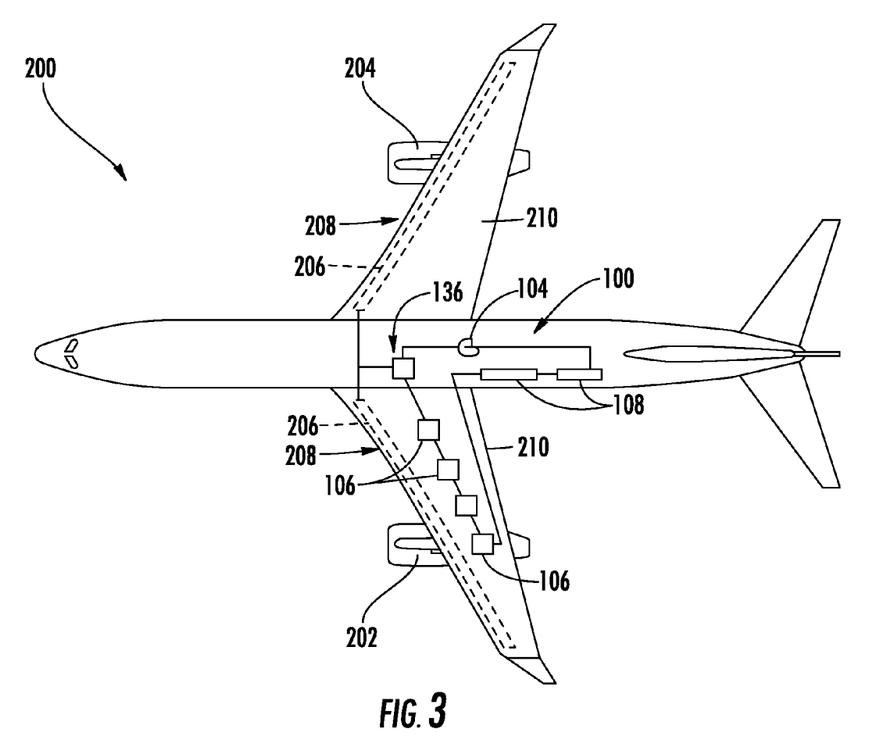
FIG. 3 is a simplified schematic view of a thermal management system in accordance with another exemplary embodiment of the present disclosure.

Referring now to FIG. 3, a thermal management system 100 in accordance with another exemplary embodiment of the present disclosure is provided. The exemplary thermal management system 100 depicted schematically in FIG. 3 may be configured in substantially the same manner as the exemplary thermal management system 100 described above with reference to FIG. 2. Like numerals have been used in FIG. 3 to identify the same or similar components as the thermal management system 100 of FIG. 2.

For the embodiment of FIG. 3, the thermal management system 100 is incorporated into an aircraft 200 and at least partially into a gas turbine engine. Specifically, the thermal management system 100 is incorporated into the aircraft 200 and a first turbofan engine 202 and/or a second turbofan engine 204. The first and second turbofan engines 202, 204 may each be configured in substantially the same manner as the exemplary turbofan engine 10 described above with reference to FIG. 1.

Additionally, as is depicted, the exemplary thermal management system 100 of FIG. 3 includes a thermal transport bus 102 having a heat exchange fluid flowing therethrough, along with a pump 104 for generating a flow of the heat exchange fluid in the thermal transport bus 102. Additionally, the exemplary thermal management system 100 includes a plurality of heat source exchangers 106 and at least one heat sink exchanger 108. The plurality of heat source exchangers 106 are in thermal communication with the heat exchange fluid in the thermal transport bus 102 and the at least one heat sink exchanger 108 permanently or selectively in thermal communication with the heat exchange fluid in a thermal transport bus 102.

As with the exemplary thermal management system 100 described above with reference to FIG. 2, for the exemplary thermal management system 100 of FIG. 3, the at least one heat sink exchangers 108 are positioned at a location downstream of the plurality of heat source exchangers 106. However, for the embodiment of FIG. 3, the exemplary thermal management system 100 may be integrated into both the aircraft 200 and the turbofan engine 202. For example, in the exemplary embodiment of FIG. 3, one or more of the heat source exchangers 106 may be located in the turbofan engine 202 and one or more of the heat source exchangers 106 may be located in the aircraft 200. Similarly, one or more of the heat sink exchangers 108 may be located in the turbofan engine 202 and one or more of the heat sink exchangers 108 may be located in the aircraft 200.

Additionally, other elements of the exemplary thermal management system 100 may be positioned at any suitable location. For example, as is depicted schematically, the thermal management system 100 of FIG. 3 includes a de-icing module 136 having thermal lines 206 (depicted in phantom) for heating certain components of the aircraft 200. Accordingly, the thermal lines 206 of the de-icing module 136 may prevent or remedy icing conditions on, e.g., a forward edge 208 of a wing 210 of the aircraft 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A thermal management system for incorporation at least partially into at least one of a gas turbine engine or an aircraft, the thermal management system comprising:
   a thermal transport bus having a heat exchange fluid flowing therethrough;
   a pump for generating a flow of the heat exchange fluid in the thermal transport bus;
   a plurality of heat source exchangers in thermal communication with the heat exchange fluid in the thermal transport bus, the plurality of heat source exchangers arranged along the thermal transport bus;
   at least one heat sink exchanger permanently or selectively in thermal communication with the heat exchange fluid in the thermal transport bus at a location downstream of the plurality of heat source exchangers; and
   a compressor in fluid communication with the heat exchange fluid at a location upstream of the at least one heat sink exchanger for compressing the heat exchange fluid in the thermal transport bus.

2. The thermal management system of claim 1, wherein the plurality of heat source exchangers is configured to transfer heat from an accessory system of the gas turbine engine to the heat exchange fluid in the thermal transport bus, and wherein the at least one heat sink exchanger is configured to remove heat from the heat exchange fluid in the thermal transport bus.

3. The thermal management system of claim 1, wherein the at least one heat sink exchanger includes a plurality of individual heat sink exchangers.

4. The thermal management system of claim 3, wherein the plurality of heat sink exchangers is selectively in thermal communication with the heat exchange fluid in the thermal transport bus, and wherein the thermal transport bus includes a plurality of bypass lines for selectively bypassing each heat sink exchanger in the plurality of heat sink exchangers.

5. The thermal management system of claim 1, wherein the at least one heat sink exchanger includes at least one air to heat exchange fluid heat exchanger or fuel to heat exchange fluid heat exchanger.

6. The thermal management system of claim 1, wherein the plurality of heat source exchangers includes at least two of an environmental control system precooler, a main lubrication system heat exchanger, a generator lubrication system heat exchanger, an electronics cooling system heat exchanger, a compressor cooling air system heat exchanger, or an active clearance control system heat exchanger.

7. The thermal management system of claim 1, wherein the plurality of heat source exchangers includes at least one air to heat exchange fluid heat exchanger and at least one liquid to heat exchange fluid heat exchanger.

8. The thermal management system of claim 1, wherein the heat exchange fluid is an incompressible fluid.

9. The thermal management system of claim 1, further comprising
   a de-icing module in thermal communication with the heat exchange fluid in the thermal transport bus at a location downstream of the plurality of heat source exchangers.

10. The thermal management system of claim 9, wherein the de-icing module utilizes heat from the heat exchange fluid in the thermal transport bus to warm components of an aircraft susceptible to icing.

11. The thermal management system of claim 1, further comprising
    an expansion device in fluid communication with the heat exchange fluid at a location downstream of the at least one heat sink exchanger for expanding the heat exchange fluid in the thermal transport bus.

12. The thermal management system of claim 1, further comprising
    a fuel chiller in thermal communication with the heat exchange fluid in the thermal transport bus at a location upstream of the plurality of heat source exchangers.

13. A gas turbine engine comprising:
    a compressor section coupled to a turbine section by one or more shafts;
    a main lubrication system for providing lubrication to one or more components located in at least one of the compressor section or the turbine section; and
    a thermal management system including
      a thermal transport bus having a heat exchange fluid flowing therethrough;
      a plurality of heat source exchangers in thermal communication with the heat exchange fluid in the thermal transport bus, the plurality of heat source exchangers arranged along the thermal transport bus and including a heat exchanger for transferring heat from the main lubrication system to the heat exchange fluid in the thermal transport bus;
      at least one heat sink exchanger permanently or selectively in thermal communication with the heat exchange fluid in the thermal transport bus at a location downstream of the plurality of heat source exchangers; and
      a compressor in fluid communication with the heat exchange fluid at a location upstream of the at least one heat sink exchanger for compressing the heat exchange fluid in the thermal transport bus.

14. The gas turbine engine of claim 13, wherein the at least one heat sink exchanger includes a plurality of individual heat sink exchangers.

15. The gas turbine engine of claim 14, wherein the plurality of heat sink exchangers is selectively in thermal communication with the heat exchange fluid in the thermal transport bus, and wherein the thermal transport bus includes a plurality of bypass lines for selectively bypassing each heat sink exchanger in the plurality of heat sink exchangers.

16. The gas turbine engine of claim 13, wherein the at least one heat sink exchanger includes at least one of a RAM heat exchanger, a fuel heat exchanger, a fan stream heat exchanger, or a bleed air heat exchanger.

17. The gas turbine engine of claim 13, wherein the plurality of heat source exchangers additionally includes an environmental control system precooler, a generator lubrication system heat exchanger, an electronics cooling system heat exchanger, a compressor cooling air system heat exchanger, or an active clearance control system heat exchanger.

18. The gas turbine engine of claim 13, wherein the plurality of heat source exchangers includes at least one air to heat exchange fluid heat exchanger and at least one liquid to heat exchange fluid heat exchanger.

19. The gas turbine engine of claim 13, further comprising a de-icing module in thermal communication with the heat exchange fluid in the thermal transport bus at a location downstream of the plurality of heat source exchangers.

20. The gas turbine engine of claim 13, further comprising an evaporator in fluid communication with the heat exchange fluid at a location downstream of the at least one heat sink exchanger for expanding the heat exchange fluid any thermal transport bus.

\* \* \* \* \*